United States Patent
Otsuki

(10) Patent No.: US 7,652,564 B2
(45) Date of Patent: Jan. 26, 2010

(54) INFORMATION PROCESSING APPARATUS, NON-CONTACT IC READER/WRITER, TIME CORRECTION METHOD, AND COMPUTER PRODUCT

(75) Inventor: Takuya Otsuki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 309 days.

(21) Appl. No.: 11/287,243

(22) Filed: Nov. 28, 2005

(65) Prior Publication Data

US 2007/0030140 A1 Feb. 8, 2007

(30) Foreign Application Priority Data

Aug. 4, 2005 (JP) ............................ 2005-226662

(51) Int. Cl.
*G08B 23/00* (2006.01)
(52) U.S. Cl. ................. 340/500; 340/539.1; 340/572.1; 340/539.11
(58) Field of Classification Search ................. 455/566, 455/425; 340/500, 539.1, 572.1, 539.11; 368/21, 47
See application file for complete search history.

(56) References Cited

U.S. PATENT DOCUMENTS

| 6,282,431 | B1 * | 8/2001 | Konno ........................ 455/425 |
| 6,934,222 | B2 * | 8/2005 | Fujimori ..................... 368/204 |
| 7,050,526 | B2 * | 5/2006 | Oda et al. ................... 375/377 |
| 7,158,449 | B2 * | 1/2007 | Fujimori et al. ............... 368/47 |

FOREIGN PATENT DOCUMENTS

| JP | 2002-27555 | 1/2002 |
| JP | 2002-202389 | 7/2002 |
| JP | 2002-300640 | 10/2002 |

* cited by examiner

*Primary Examiner*—Daryl Pope
(74) *Attorney, Agent, or Firm*—Kratz, Quintos & Hanson, LLP

(57) ABSTRACT

A mobile phone set includes a clock unit that counts time and a non-contact IC that receives time data indicative of current correct time from an RFID reader/writer. When the non-contact IC receives the time data, the time of the clock unit is corrected based on the received time data.

15 Claims, 11 Drawing Sheets

INFORMATION PROCESSING APPARATUS, NON-CONTACT IC READER/WRITER, TIME CORRECTION METHOD, AND COMPUTER PRODUCT

BACKGROUND OF THE INVENTION

1. Field of the Invention

The present invention relates to technology for correcting time of a timer of an information processing apparatus.

2. Description of the Related Art

These days, mobile phone sets are also used for sending and receiving e-mails, accessing the Web, managing schedules, and so on apart from making or receiving telephone calls. Moreover, some people even use the clock in the mobile phone set instead of a wristwatch.

However, usually the time on the mobile phone set is not accurate. The time may be corrected by the user from television, radio, etc., however, this process causes the user extra effort.

A technique for automatically correcting the time in a mobile phone set is disclosed in Japanese Patent Laid-Open Publication No. 2002-27555. According to this technique, when the user connects his mobile phone set to the Internet, a time server automatically corrects the time on the mobile phone set.

Another technique for automatically correcting time in a mobile phone set is disclosed in Japanese Patent Laid-Open Publication No. 2002-300640. According to this technique, the time on the mobile phone set is automatically corrected based on time data received from a base station whenever there is an exchange of data between the mobile phone set and the base station.

Thus, in the conventional techniques, time data is received from outside. However, the bandwidth of the wireless circuit is consumed when receiving time data.

It is desirable to avoid consuming a bandwidth to get time data.

SUMMARY OF THE INVENTION

It is an object of the present invention to at least solve the problems in the conventional technology.

According to an aspect of the present invention, an information processing apparatus includes a clock unit configured to count time; a non-contact IC configured to receive time data indicative of current correct time; and a correcting unit configured to correct the time of the clock unit based on the time data received by the non-contact IC.

According to another aspect of the present invention an RFID reader/writer configured to transmit data to a non-contact IC includes a memory to store therein time data indicative of current correct time; and a transmitting unit configured to transmit the time data to the non-contact IC.

According to still another aspect of the present invention, a method of correcting time of an information processing apparatus, the information processing apparatus including a clock unit that counts time and a non-contact IC, includes the non-contact IC receiving time data indicative of current correct time from a non-contact IC reader/writer; and correcting the time of the clock unit based on received time data.

According to still another aspect of the present invention, a computer-readable recording medium is configured to store therein a computer program that implements a method of correcting time of an information processing apparatus according to the present invention.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments according to the present invention are explained next with reference to the accompanying drawings.

In the following explanation, a mobile phone set is presented as an example to explain the time correction method according to the present invention. However, the time correction method can be implemented on any information processing apparatus.

Figure 1:
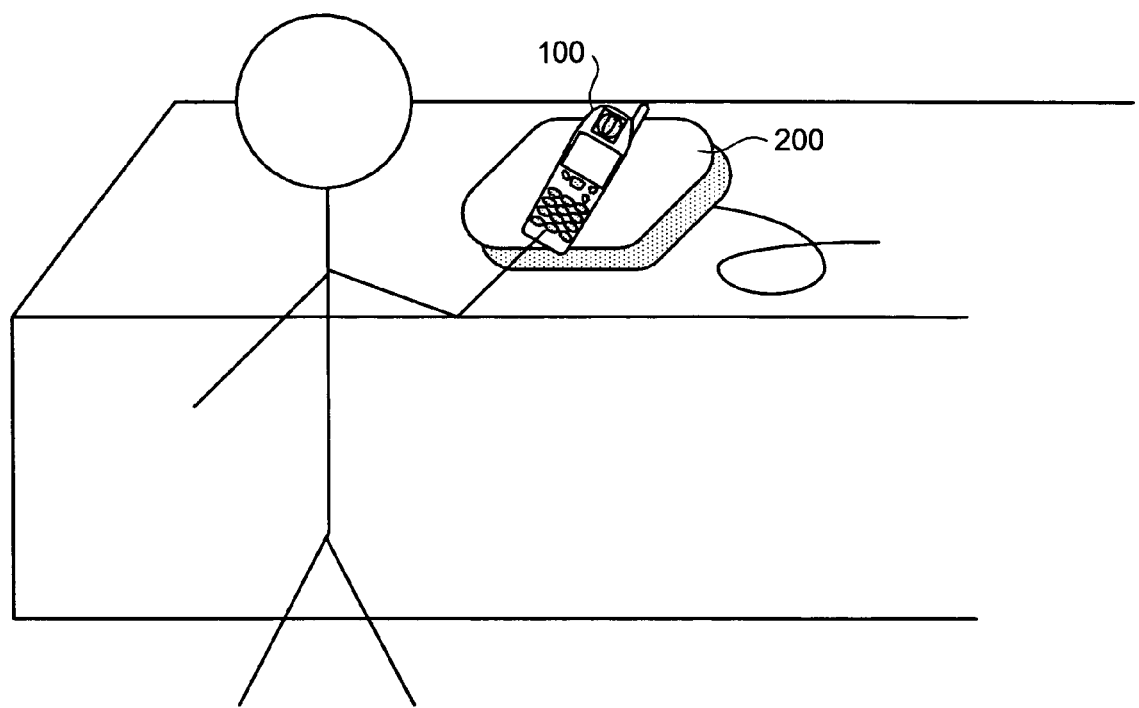
FIG. 1 is a schematic for explaining the concept of an embodiment of the present invention.

FIG. 1 is a schematic for explaining the concept of the time correction method according to an embodiment of the present embodiment.

A mobile phone set 100 according to the embodiment includes a clock function and a non-contact IC (RFID) tag. An RFID reader/writer 200 reads data from and writes data to the RFID tag. A user brings the mobile phone set 100 near the RFID reader/writer 200 for some other purpose, for example, settling a payment, the RFID reader/writer 200 transmits time data indicative of current time to the mobile phone set 100. The clock function in the mobile phone set 100 currents a time in a timer based on the time data. Thus, time on the mobile phone set can be corrected without consuming a bandwidth and also without any special efforts by the user.

Figure 2:
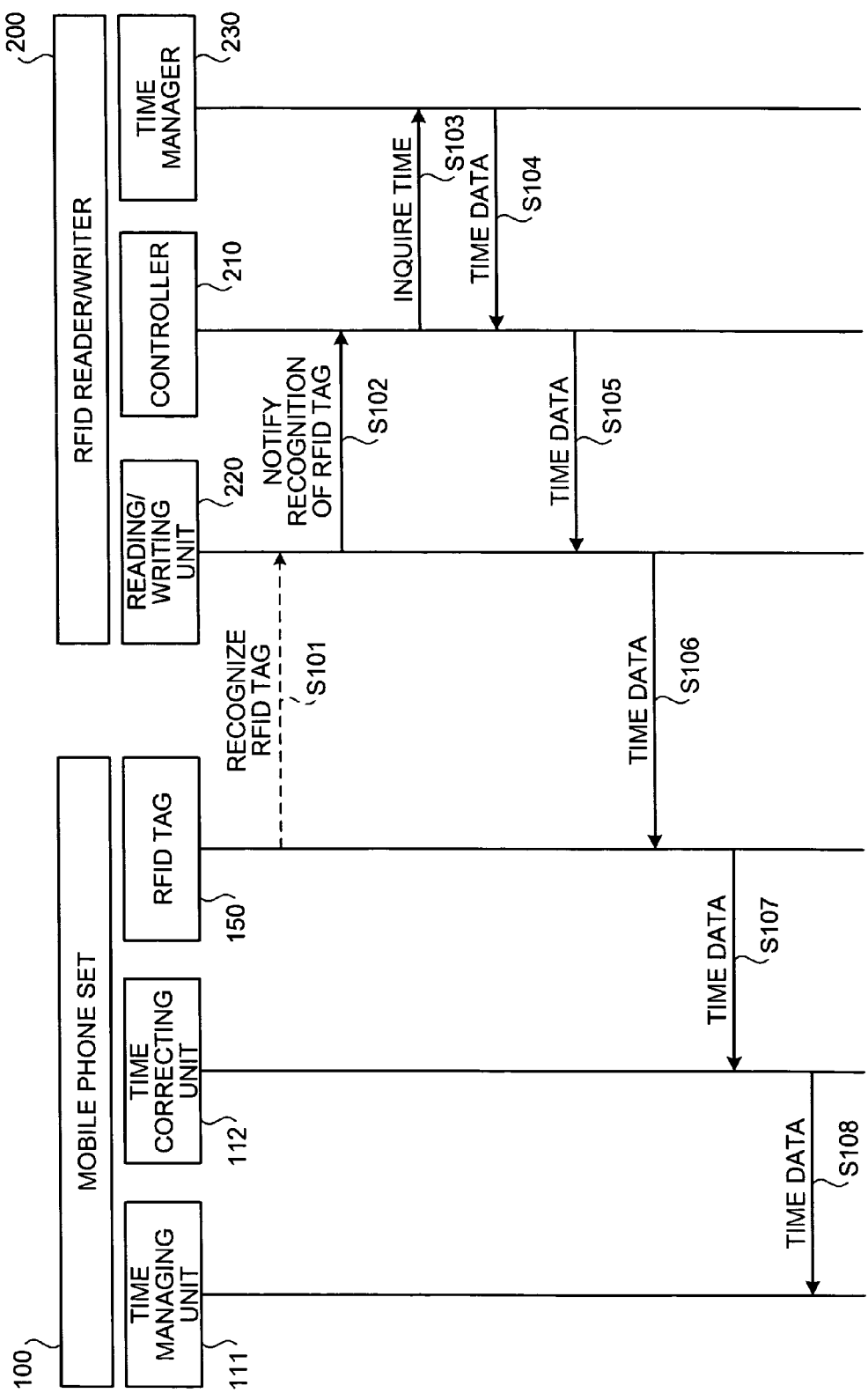
FIG. 2 is a sequence diagram illustrating an exchange of data between a mobile phone set and an RFID reader/writer according to an embodiment of the present invention.

FIG. 2 is a sequence diagram illustrating the exchange of data between the mobile phone set 100 and the RFID reader/writer 200. As shown in FIG. 2, a reading/writing unit 220 of the RFID reader/writer 200 recognizes an RFID tag 150 of the mobile phone set 100 (step S101) and notifies the fact to a controller 210 (step S102).

Upon receiving the notification, the controller 210 inquires a time manager 230 regarding the time (step S103). The time manager 230 responds by transmitting the time data it holds (step S104). The controller 210 converts the time data to a predetermined format and instructs the reading/writing unit 220 to transmit the time data to the mobile phone set 100 along with other data (step S105).

Once the RFID tag 150 of the mobile phone set 100 receives the time data from the reading/writing unit 220 (step S106), a time correcting unit 112 gets the time data from the RFID tag 150 (step S107), and corrects the time held by a time managing unit 111 (step S108).

Thus, in the time correction method according to the present invention, time correction is performed when the user holds the mobile phone set 100 over the RFID reader/writer 200, which is done as a routine when settling payments, etc. Thus, the time correction is carried out without the user having to take extra effort. Further, no consumption of bandwidth takes place as time correction is carried out during the exchange of data between the RFID tag 150 and the RFID reader/writer 200.

Further, as the Internet or communication with the base station is obviated, the time correction method according to the present invention can be used in a wide range of information processing apparatuses, such as a personal computer, that has an RFID tag.

Figure 3:
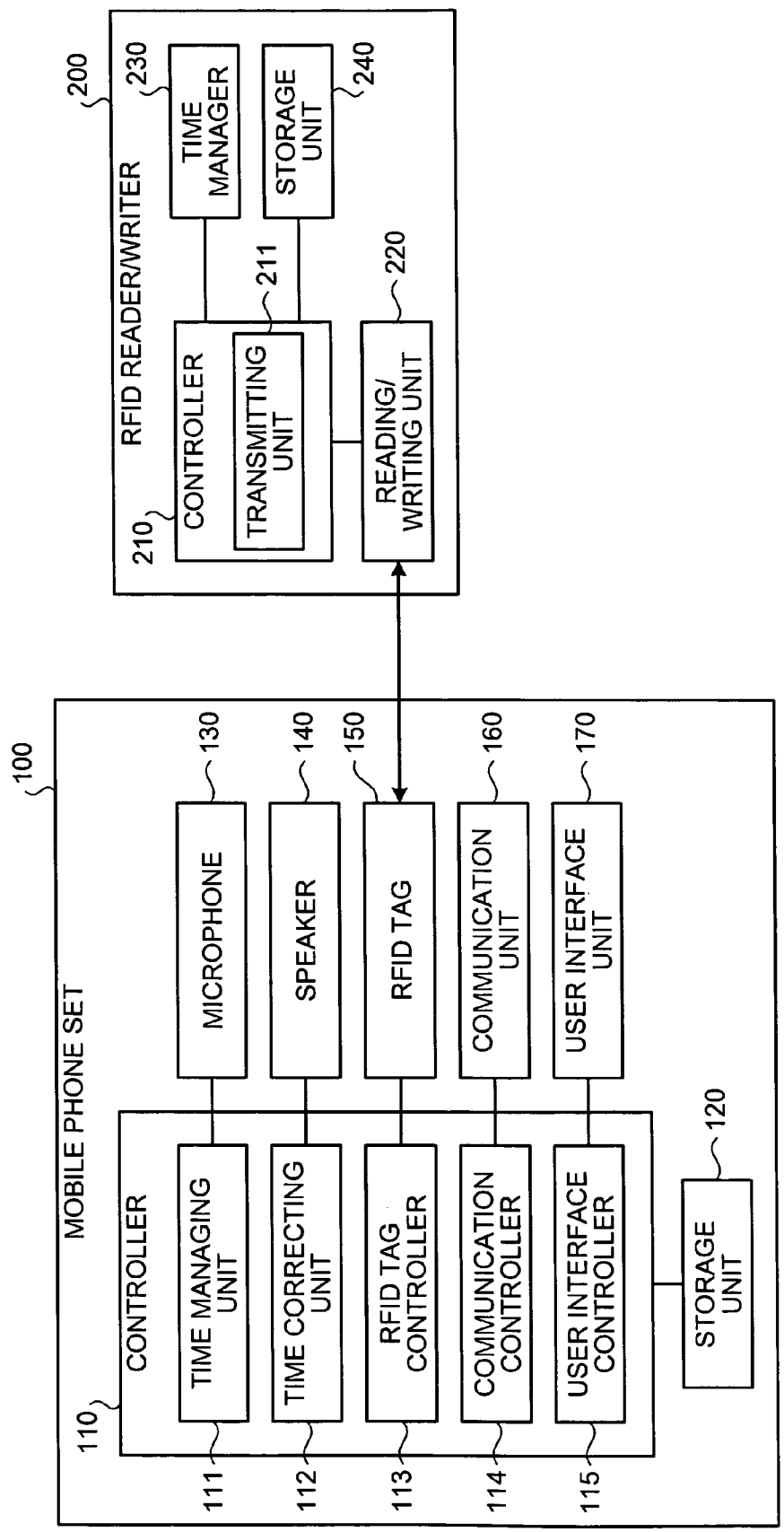
FIG. 3 is a block diagram of the mobile phone set and the RFID reader/writer.

Structures of the mobile phone set 100 and the RFID reader/writer 200 shown in FIG. 1 are explained next. FIG. 3 is a drawing of the configurations of the mobile phone set 100 and the RFID reader/writer 200.

The mobile phone set 100 includes a controller 110, a storage unit 120, a microphone 130, a speaker 140, the RFID tag 150, a communication unit 160, and a user interface unit 170.

The controller 110 controls the entire mobile phone set 100 and includes the time managing unit 111, the time correcting unit 112, an RFID tag controller 113, a communication controller 114, and a user interface controller 115. The time managing unit 111 manages the time.

The time correcting unit 112 corrects the time managed by the time managing unit 111. Specifically, when the RFID tag 150 receives the time data, the time correcting unit 112 gets the time data from the RFID tag 150 and determines whether it is in an appropriate format. If the time data is found to be in the appropriate format, the time correcting unit 112 sets the time data in the time managing unit 111.

Figure 4:
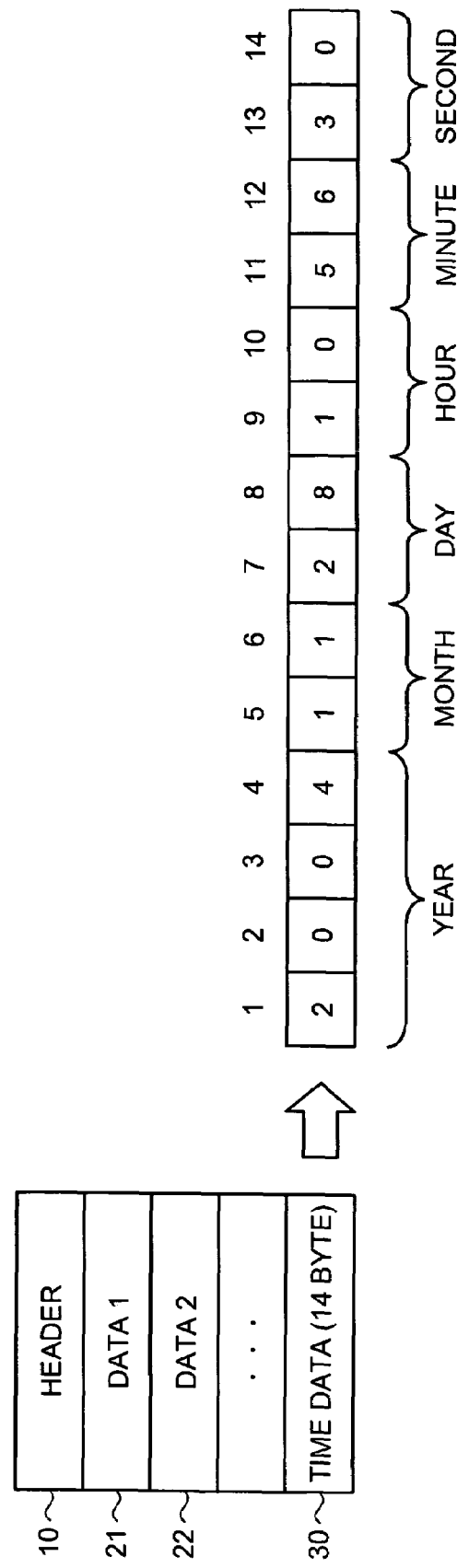
FIG. 4 is an example of a format of time data used in the embodiment.

FIG. 4 is an example of a format of the time data. As shown in FIG. 4, the time data 30 is a 14-byte string sent along with a header 10 and other data 21, 22, etc. The first four bytes of the time data 30 indicate the year, and subsequent pairs of bytes indicate the month, date, hour, minute, and second, respectively.

In the example shown in FIG. 4, the time data 30 is a 14-byte string "20041128105630", and indicates the date to be Oct. 28, 2004 and the time to be 10:56:30.

The time correcting unit 112 determines whether the time data received by the RFID tag 150 is in the designated format and whether the content of the time data is correct. If the format or the content of the time is incorrect, the time correcting unit 112 discards the incorrect time data and does not incorporate it in the time managing unit 111.

The time correcting unit 112 may be configured to automatically recognize an appropriate format from a plurality of time data formats being used by different types of RFID reader/writer. Further, the RFID reader/writer can be configured to transmit format data along with the time data so that the time correcting unit 112 can determine the format with the aid of the format data.

The time correcting unit 112 also determines whether to set the time data in the time managing unit 111 based on the setting done by the user.

Figure 5:
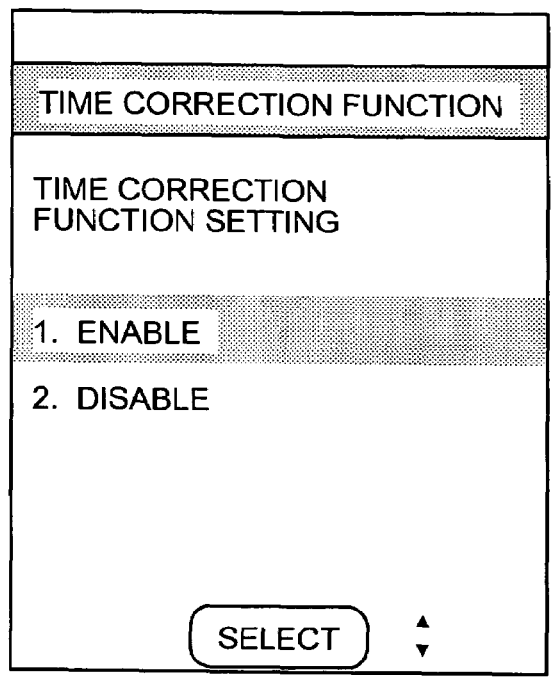
FIG. 5 is a schematic of a screen for setting a time correction function.

FIG. 5 is a drawing of a Time correction function setting screen where the time correction function is set as enabled or disabled. If the user prefers not to have the clock auto-corrected, he/she may disable the clock correction function on the Time correction function setting screen. If the time correction function is disabled on the Time correction function setting screen, the setting is stored in the storage unit 120. The time correcting unit 112 does change the time maintained by the time managing unit 111 if the storage unit 120 has stored in it the setting for disabling the time correction function.

Figure 6:
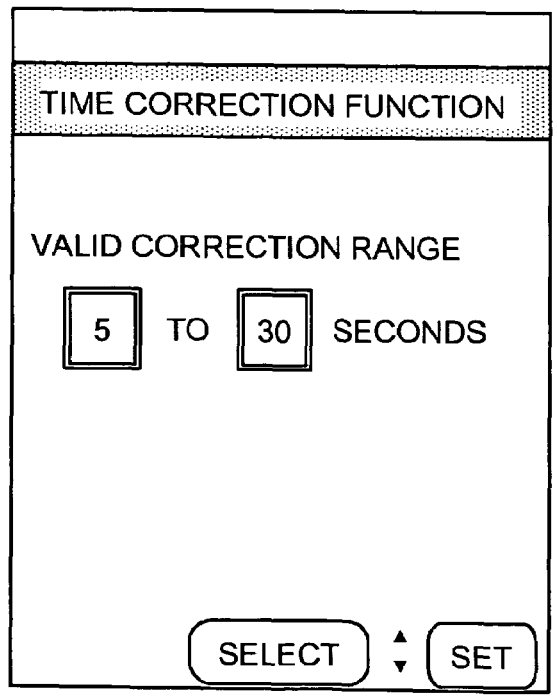
FIG. 6 is a schematic of a screen for setting a correction range for the time correction function.

FIG. 6 is a drawing of a Correction range setting screen where a correction range for the time correction function is set. In the cases where the difference between the time on the mobile phone set 100 and the RFID reader/writer 200 is considerably large and there is a possibility that the time on the RFID reader/writer 200 is incorrect, or when the user may not mind insignificant time inaccuracies and may want to lower the precision of time correction, the user can set the lower limit and the upper limit for the time difference auto-correction of the time is to be carried out.

If valid lower limit and the upper limit of the difference of time are set on the Correction range setting screen, the settings are stored in the storage unit 120. If the time difference between the time data received from the RFID reader/writer 200 and time set in the time managing unit 111 is outside the range specified on the Correction range setting screen, the time correcting unit 112 does change the time maintained by the time managing unit 111. The lower limit can be invalidated by setting 0 as its value. Likewise, the upper limit can be invalidated by setting 0 as its value.

Figure 7:
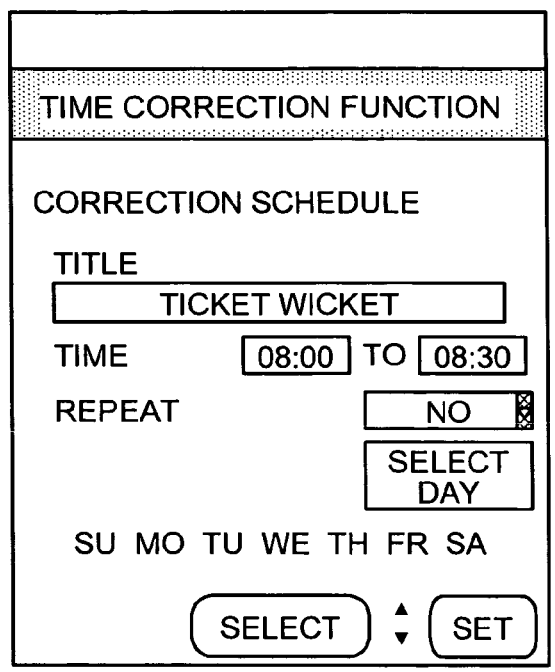
FIG. 7 is a schematic of a screen for setting a schedule for the time correction function.

FIG. 7 is a drawing of a Schedule setting screen for setting a schedule for the time correction function. Let us suppose that the RFID tag 150 of the mobile phone set 100 is configured to function as a train pass. The user can then set a schedule for time correction to coincide with the time slot when he/she holds the mobile phone set 100 over a ticket wicket every day. Thus, the time correction is performed only during the designated time slot.

When a time slot is set as the schedule for time correction on the Schedule setting screen, the setting is stored in the storage unit 120. If the current time is not in the specified time slot, the time correcting unit 112 does not change the time maintained by the time managing unit 111. It is also possible to set a schedule for disabling time correction. In this case, the time correcting unit 112 does not change the time maintained by the time managing unit 111 during the specified time slot.

Upon setting the time data in the time managing unit 111, the time correcting unit 112 instructs the user interface controller 115 to notify the user that the time has been set through a message or by a blinking light emitting diode (LED), etc. Alternatively, the time correcting unit 112 may be configured not to notify time correction if the time correction is carried out if the user happens to be accessing the Web using the user interface unit 170.

To return to FIG. 3, the RFID tag controller 113 controls the processes concerning reading data from and writing data to the RFID tag 150. For example, if the time data has been received by the RFID tag 150, the RFID tag controller 113 notifies the fact to the time correcting unit 112 and passes on the time data to the time correcting unit 112.

The communication controller 114 controls the communication unit 160 to enable the mobile phone set to function as a telephone or connect to the Internet. The user interface controller 115 controls the user interface unit 170 and, after the time correction is carried out, displays a message or causes the LED to blink, etc., based on the instruction from the time correcting unit 112.

Figure 8:
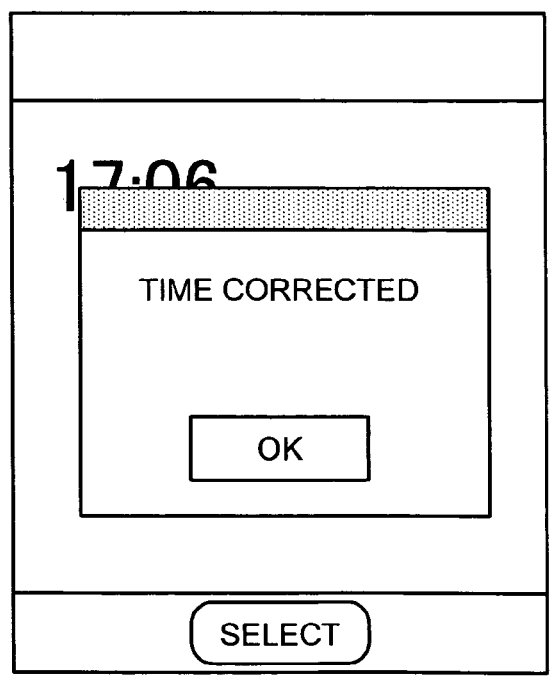
FIG. 8 is a schematic for explaining a notification that time correction has been completed.
Figure 9:
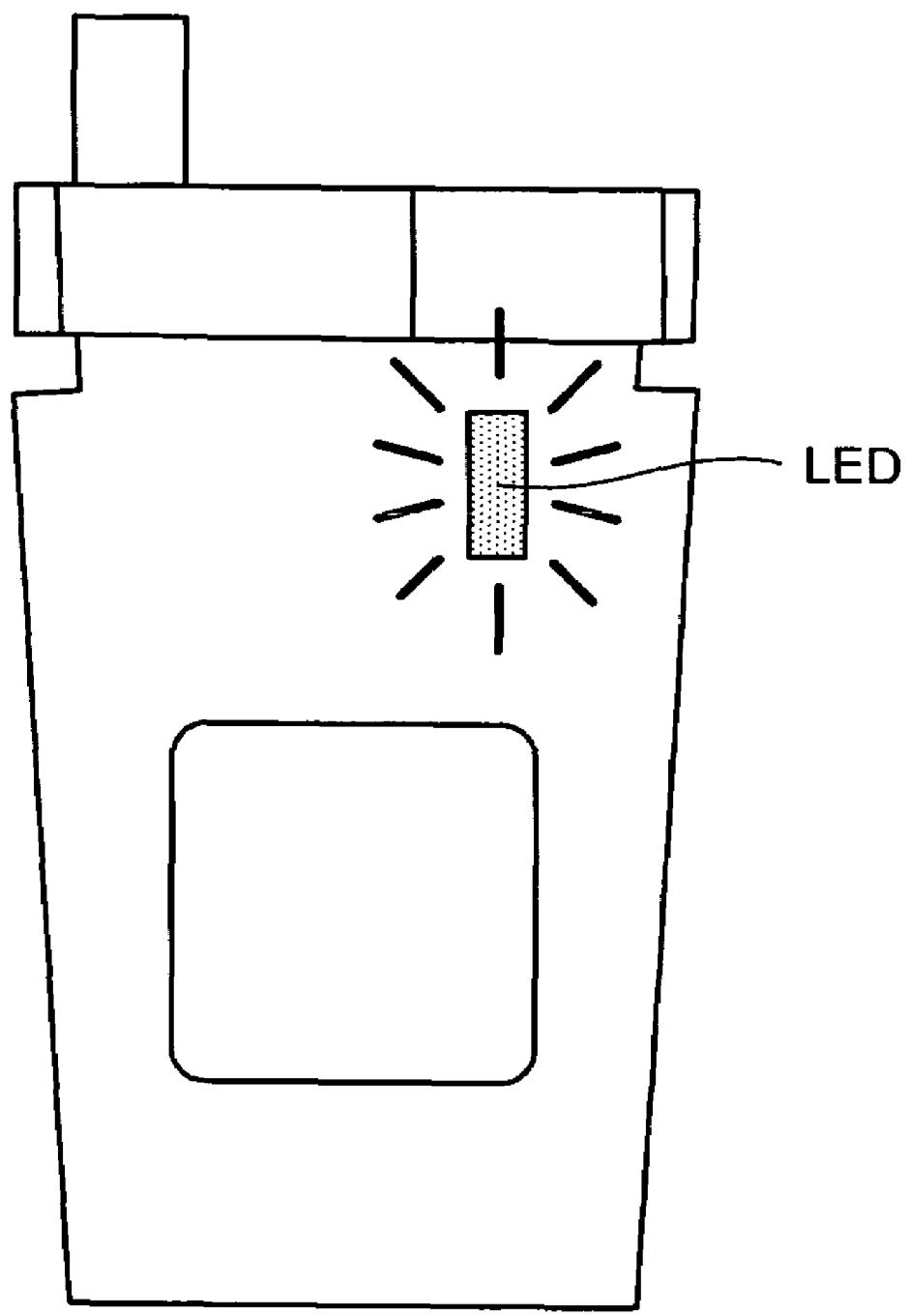
FIG. 9 is another schematic for explaining a notification that time correction has been completed.

FIG. 8 is a drawing of a message display to notify that time correction has been performed. FIG. 9 is a drawing illustrating the LED blinking to notify that time correction has been performed.

The storage unit 120 stores various types of data, including the settings for time correction. The microphone 130 and speaker 140 are used when the mobile phone set 100 is used as a telephone.

The RFID tag 150 is assigned a unique ID and includes an antenna that transmits and receives data over radio wave and a memory circuit that stores various types of data. The communication unit 160 is a device that enables the mobile phone set 100 to physically realize the functionalities of a telephone or to connect to the Internet. The user interface unit 170 includes a display, the LED, an operation panel, etc., and presents information to the user and receives instruction, etc. from the user.

The RFID reader/writer 200 includes the controller 210, the reading/writing unit 220, the time manager 230, and a storage unit 240. The controller 210 controls the entire RFID reader/writer 200 and includes a transmitting unit 211.

When the reading/writing unit 220 recognizes the RFID tag 150, the transmitting unit 211 gets the time held by the time manager 230 and transmits the time to the RFID tag 150 through the reading/writing unit 220.

The reading/writing unit 220 recognizes the proximity of the RFID tag 150 and transmits or receives data, according to need. The time manager 230 manages the time and keeps accurate time by periodically accessing a time server on the Internet. The storage unit 240 stores various types of data.

Figure 10:
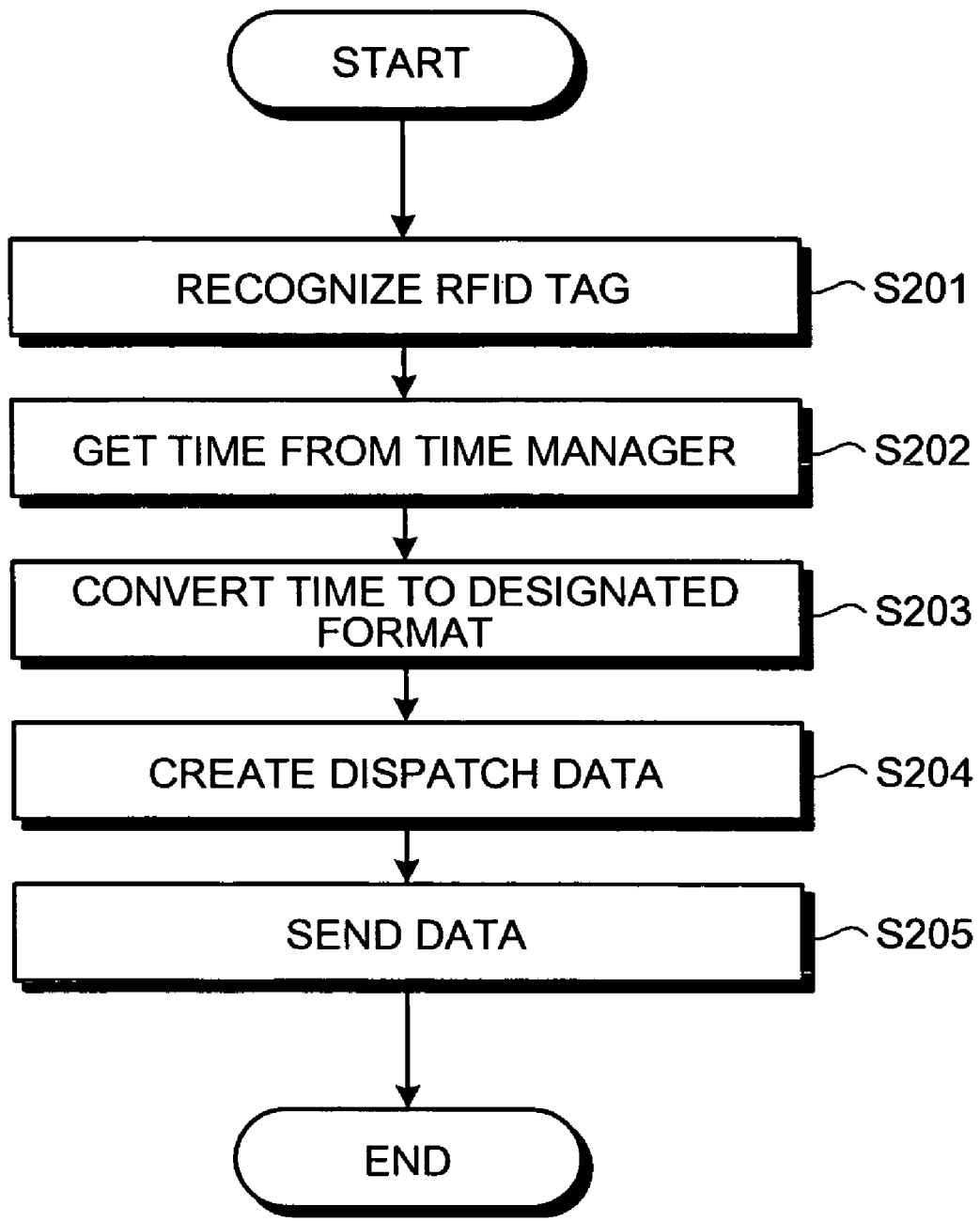
FIG. 10 is a flow chart of a process procedure performed by the RFID reader/writer shown in FIG. 3.

A process procedure performed by the RFID reader/writer 200 is explained next. FIG. 10 is a flow chart of the process procedure performed by the RFID reader/writer 200 shown in FIG. 3. As shown in FIG. 10, when the reading/writing unit 220 of the RFID reader/writer 200 recognizes the proximity of the RFID tag 150 (step S201), the transmitting unit 211 gets the time data from the time manager 230 (step S202).

The transmitting unit converts the time data to a designated format (step S203), combines the converted time data with other data to create transmission data (step S204), and transmits the transmission data to the RFID tag 150 through the reading/writing unit 220 (step S205).

Figure 11:
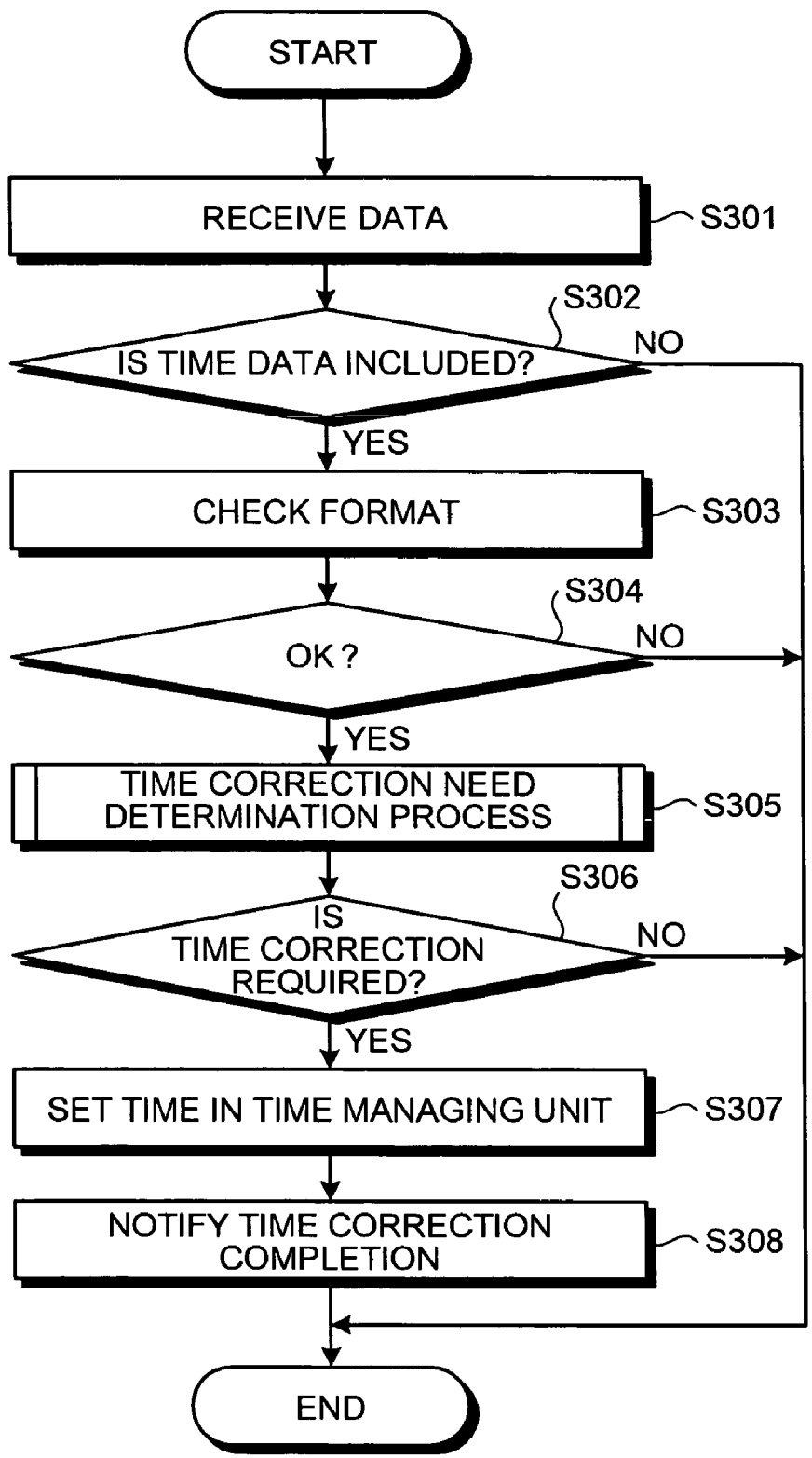
FIG. 11 is a flow chart of a process procedure performed by the mobile phone set shown in FIG. 3.

A process procedure performed by the mobile phone set 100 is explained next. FIG. 11 is a flow chart of the process procedure performed by the mobile phone set 100.

As shown in FIG. 11, when the RFID tag 150 of the mobile phone set 100 receives the data from the RFID reader/writer 200 (step S301), the RFID tag controller 113 checks whether the data includes time data (step S302). If no time data is found ("No" at step S302), the time correction process is ended.

If the data includes time data ("Yes" at step S302), the time correcting unit 112 checks the format of the time data (step S303). If the format of the time data is found to be incorrect ("No" at step S304), the time correction process is ended. If the format is found to be correct ("Yes" at step S304), a determination of the need for time correction is carried out (step S305). A process procedure for determining the need for time correction is explained a little later.

If it is determined that time correction is not required as a result of the process of determining the need for time correction ("No" at step S306), the time correction process is ended. However, if it is determined that time correction is required ("Yes" at step S306), the time is set in the time managing unit 111 (step S307) and the user interface controller 115 is instructed to notify the user that time correction has been carried out (step S308).

Figure 12:
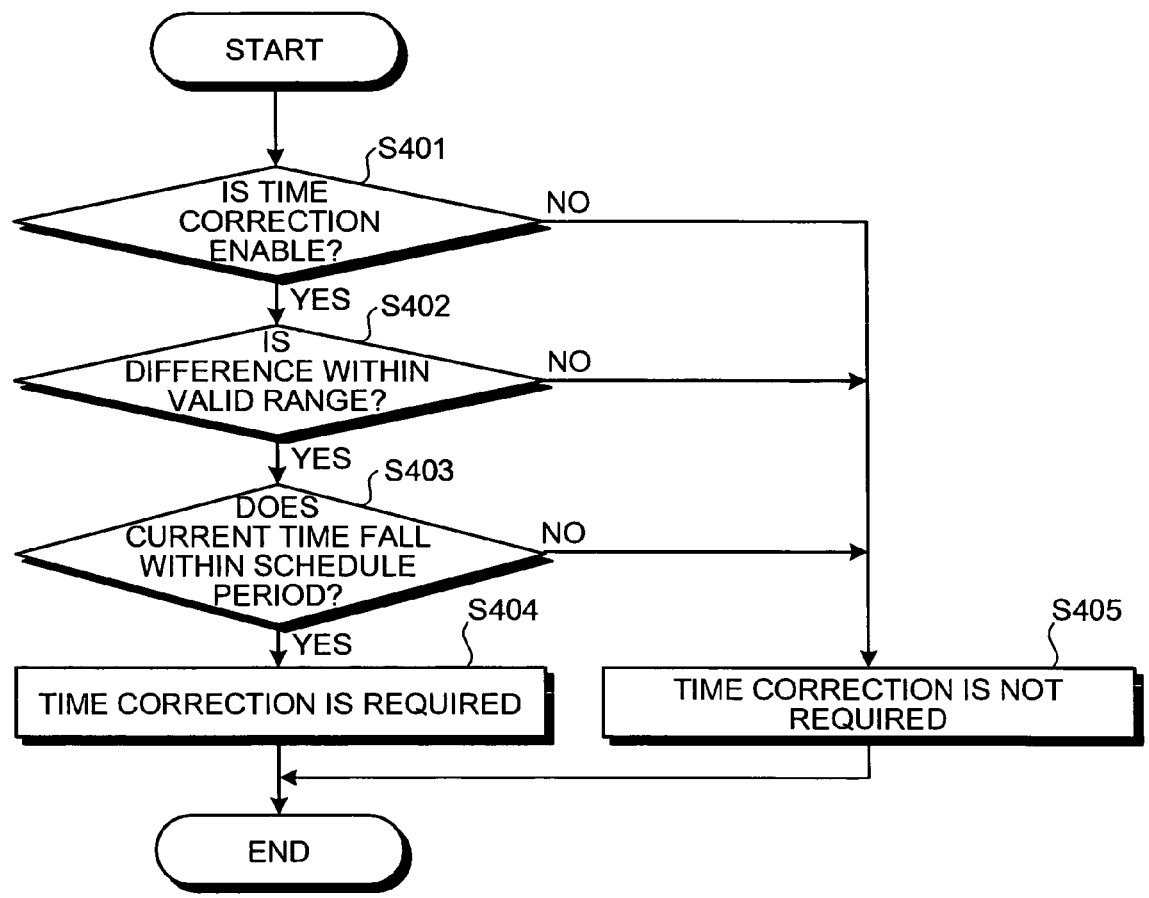
FIG. 12 is a flow chart of a time correction need determination process shown in FIG. 11.

The process procedure for determining the need for time correction shown in FIG. 11 is explained next. FIG. 12 is a flow chart of the process procedure for determining the need for time correction shown in FIG. 11.

As shown in FIG. 12, it is first determined whether the time correction function is enabled (step S401). If the time correction function is enabled ("Yes" at step S401), it is determined whether the time difference is within the specified valid range (step S402). If the time difference is found to be within the valid range ("Yes" at step S402), it is determined whether the current time falls within the schedule period (step S403).

If the current time falls within the schedule period ("Yes" at step S403), it is determined that the time correction is required (step S404). If the answer to any of the above three conditions is "No" (that is, "No" at step S401, or step S402, or step S403), it is determined that time correction is not required (step S405).

In the present description, three conditions for determining the need for time correction are presented as an example. However, any one or two of these conditions in any combination thereof may be used for determining the need for time correction.

The various processes of the time correcting unit 112 explained in the present embodiment can be realized by a readily available time correction program. An embodiment of the present invention is explained as the time correction program, where the mobile phone set 100 is considered to be a computer.

Figure 13:
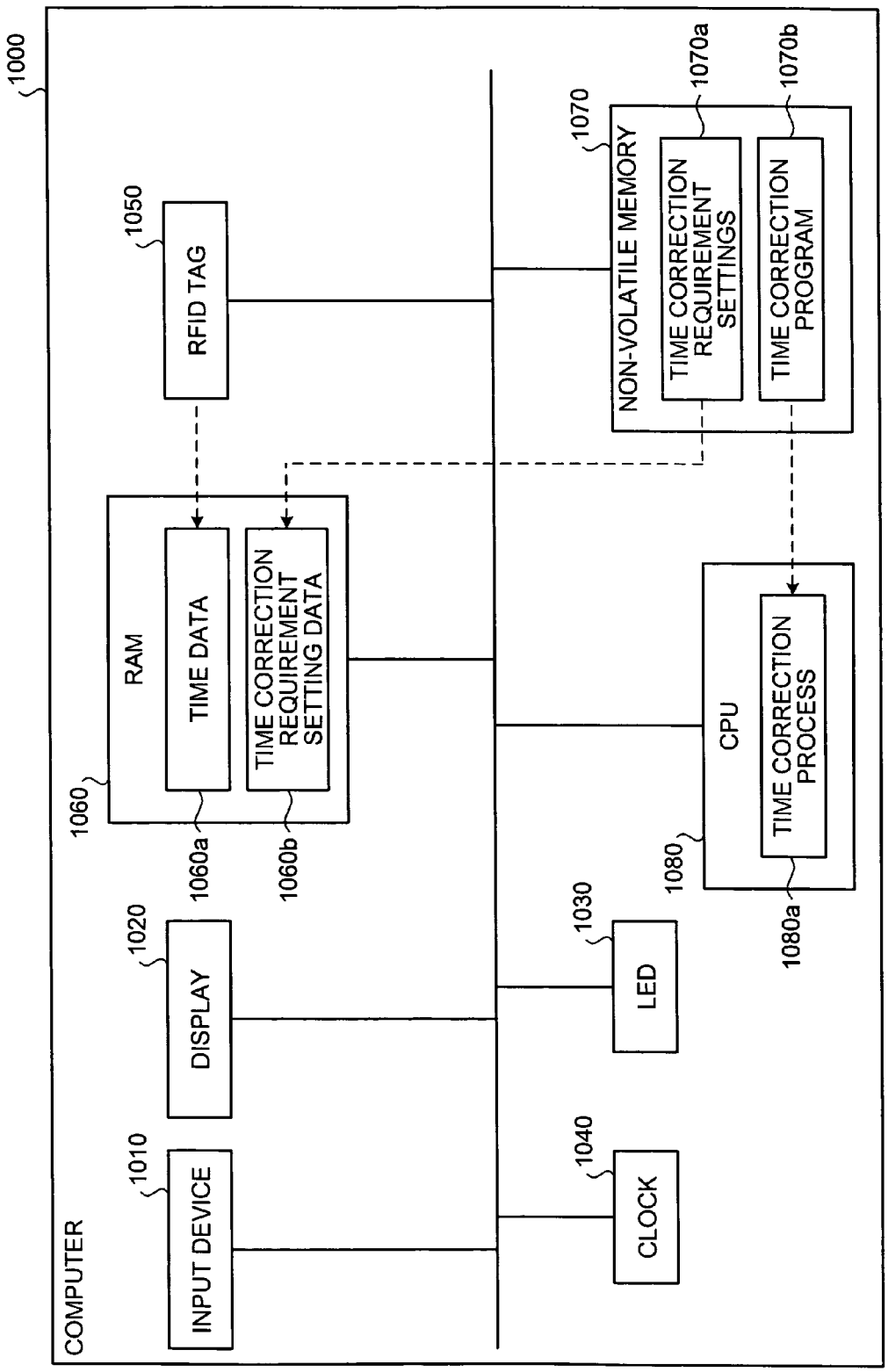
FIG. 13 is a functional block diagram of a computer that implements a method according to the embodiment by executing a computer program.

FIG. 13 is a functional block diagram of a computer that executes the time correction program. A computer 1000 includes an input device 1010 that accepts input of data from the user, a display 1020 that displays data, an LED 1030, a clock 1040 that keeps time, an RFID tag 1050, a random access memory (RAM) 1060, a non-volatile memory 1070, and a central processing unit (CPU) 1080.

The non-volatile memory 1070 has stored in it a time correction program 1070b that functions similar to the time correcting unit 112. Also stored in the non-volatile memory 1070 is time correction requirement settings 1070a required for determining the need for time correction.

The CPU 1080 loads the time correction program 1070b from the non-volatile memory 1070 and executes it as a time correction process 1080a.

Further, the CPU 1080 loads the required data from the time correction requirement settings 1070a from the non-volatile memory 1070 and stores it in the RAM 1060 as time correction requirement setting data 1060b. The time data received by the RFID tag 1050 is stored in the RAM 1060 as time data 1060a.

The CPU 1080 processes the various types of data based on the time data 1060a and the time correction requirement setting data 1060b stored in the RAM 1060.

Aside from storing the time correction program 1070b on the non-volatile memory 1070, the time correction program 1070b may also be stored on a storage medium such as a memory card and executed by the computer 1000 by loading the time correction program 1070b from the recording medium. The time correction program 1070b may also be stored on another computer (or server) connected via a wireless network to the computer 1000 and executed by the computer 1000 by loading the time correction program 1070b from the other computer (server).

Thus, according to the embodiment, an RFID reader/writer transmits time data to an RFID tag of an information processing device, and the information processing device corrects its own time based on the received time data. Consequently, time correction is carried out when the user uses the information processing device routinely, obviating extra effort on the part of the user. Moreover, the time data is sent to the RFID tag during the exchange of data between the RFID reader/writer and the RFID tag, time correction can be performed without consuming the bandwidth of the wireless circuit. Moreover, the user can know that the time of his information processing apparatus has been corrected.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. An information processing apparatus, comprising:
   a clock unit configured to count time;
   An RFID tag configured to receive time data indicative of current correct time from an RFID tag reader/writer when the information processing apparatus communicates with the RFID tag reader/writer; and
   a correcting unit configured to correct the time of the clock unit based on the time data received by the RFID tag; and
   an indicating unit configured to indicate that the time has been corrected in such a manner that a user of the information processing apparatus will know that the time has been corrected to current correct time when the correcting unit completes correction of the time.

2. The information processing apparatus according to claim 1, further comprising a correction ON/OFF unit that decides whether the time correcting unit is to perform correction of the time, wherein
   the time correcting unit is configured not to correct the time if the correction ON/OFF unit decides the correction of the time is not to be performed.

3. The information processing apparatus according to claim 1, wherein the time correcting unit calculates a difference between the time of the clock unit and a time indicated by the time data, and does not correct the time if the difference is outside of a pre-set range.

4. The information processing apparatus according to claim 1, wherein the time correcting unit checks the time of the clock unit and does not correct the time if the time of the clock unit is outside of a pre-set time slot.

5. A computer-readable recording medium configured to store therein a computer program that implements a method of correcting time of an information processing apparatus, the information processing apparatus including a clock unit that counts time and an RFID tag, the computer program causing the information processing apparatus to execute:
   receiving by the RFID tag time data indicative of current correct time from an RFID reader/writer when the information processing apparatus communicates with the RFID tag reader/writer; and
   correcting the time of the clock unit based on received time data; and
   indicating that the correcting is completed so that a user of the RFID tag reader/writer will know that the time has been corrected to current correct time after the correcting is completed.

6. The computer-readable recording medium according to claim 5, the computer program further causing the information processing apparatus to execute setting ON/OFF of time correction, and
   causing the information processing apparatus to not execute the correcting if the time correction is set OFF.

7. The computer-readable recording medium according to claim 5, the computer program further causing the information processing apparatus to execute calculating a difference between the time of the clock unit and a time indicated by the time data, and
   causing the information processing apparatus to not execute the correcting if the difference is outside of a pre-set range.

8. The computer-readable recording medium according to claim 5, the computer program further causing the information processing apparatus to execute checking the time of the clock unit, and
   causing the information processing apparatus to not execute the correcting if the time of the clock unit is outside of a pre-set time slot.

9. A method of correcting time of an information processing apparatus, the information processing apparatus including a clock unit that counts time and an RFID tag, comprising:
   the RFID tag receiving time data indicative of current correct time from an RFID tag reader/writer when the information processing apparatus communicates with the RFID tag reader/writer; and
   correcting the time of the clock unit based on received time data; and
   indicating that the correcting is completed so that a user of the information processing apparatus will know that the time has been corrected to current correct time after the correcting is completed.

10. The method according to claim 9, further comprising setting ON/OFF of time correction, and
    causing to not execute the correcting if the time correction is set OFF.

11. The method according to claim 9, further comprising calculating a difference between the time of the clock unit and a time indicated by the time data, and
    causing to not execute the correcting if the difference is outside of a pre-set range.

12. The method according to claim 9, further comprising checking the time of the clock unit, and
    causing to not execute the correcting if the time of the clock unit is outside of a pre-set time slot.

13. The information processing apparatus according to claim 1, wherein the information processing apparatus is comprised in a mobile phone set, and wherein the uses other than time correction comprise settling a payment.

14. The computer-readable recording medium according to claim 5, wherein the information processing apparatus is comprised in a mobile phone set, and wherein the uses other than time correction comprise settling a payment.

15. The method of correcting time according to claim 9, wherein the information processing apparatus is comprised in a mobile phone set, and wherein the uses other than time correction comprise settling a payment.

* * * * *